United States Patent [19]

Van Der Sanden

[11] Patent Number: 4,944,161
[45] Date of Patent: Jul. 31, 1990

[54] APPARATUS FOR FREEZING LIQUID-CARRYING PIPES

[76] Inventor: Josephus A. Van Der Sanden, Lange Voren 14, NL-5521 DD Eersel, Netherlands

[21] Appl. No.: 313,860

[22] Filed: Feb. 23, 1989

[30] Foreign Application Priority Data

Feb. 26, 1988 [DE] Fed. Rep. of Germany ... 8802515[U]

[51] Int. Cl.$^5$ .............................................. F25D 3/00
[52] U.S. Cl. ........................................ 62/293; 138/97; 62/384
[58] Field of Search ..................... 62/293, 384; 138/97

[56] References Cited

U.S. PATENT DOCUMENTS

| 2,483,082 | 9/1949 | Young et al. | 62/293 |
| 2,572,555 | 10/1951 | Young et al. | 62/515 |
| 3,559,423 | 2/1971 | Scheidler | 62/293 |
| 3,623,337 | 11/1971 | Tremont | 62/293 |
| 3,742,723 | 7/1973 | Grise | 62/293 |
| 3,857,255 | 12/1974 | Elwood et al. | 62/293 |
| 4,309,875 | 1/1982 | Radichio | 62/293 |
| 4,370,862 | 2/1983 | Beister | 62/293 |
| 4,416,118 | 11/1983 | Brister | 62/66 |
| 4,433,556 | 2/1984 | Brady | 62/293 |

Primary Examiner—Ronald C. Capossela
Attorney, Agent, or Firm—Antonelli, Terry, Stout & Kraus

[57] ABSTRACT

Apparatus for freezing liquid-carrying pipes, with an annular casing having an inwardly open cross-section, with a supply line, provided with a valve, for supplying a refrigerant to the interior of the casing, which is improved in that the casing (1) has two parts (2,3) which can be directly fixed together at right angles to the casing axis and with end walls (4,6;7,8) kept spaced by a jacket wall (9,11) and that a carbon dioxide supply lance (43) with its end face (44) having an opening can be brought up to the connecting face of the inside edges (41) of end walls (4,6;7,8).

9 Claims, 2 Drawing Sheets

APPARATUS FOR FREEZING LIQUID-CARRYING PIPES

BACKGROUND OF THE INVENTION

The invention relates to an apparatus for freezing liquid-carrying pipes, with an annular casing having an inwardly open cross-section, with a supply line, provided with a valve, for supplying a refrigerant to the interior of the casing.

In the case of repairs or installation measures on liquid-carrying pipes or lines, particularly heating pipes, such as when fitting regulating or control valves or replacing heaters and the like, to avoid the need for shutting down the complete heating plant and emptying the pipe or line is frozen, so that a solid plug is formed therein. This is brought about in that a sleeve is placed around the pipe and into it is introduced the refrigerant. Apparatuses exist in which the refrigerant is produced by a heat pump and circulates in a closed circuit through the sleeve and is conveyed back to the heat pump. In another construction there is no circulation of the refrigerant and it instead passes out of a storage bottle or cylinder through the sleeve and an outlet port therein into the environment. The outlet port can optionally be provided with a hose, so that part of the refrigerant can be led away into the open from the freezing and working point and optionally out of a room or the like. The non-removed quantity, of refrigerant such as chlorinated hydrocarbons, constitute a potential hazard for workers, particularly when carrying out soldering and/or welding. The known sleeve-like casing of the apparatus can be open towards the pipe and together with the latter forms a cavity around the same, into which the refrigerant is introduced and can come into direct contact with the outer wall of the pipe, which increases effectiveness. Known apparatuses, which in part do not fulfill the latter requirement are known from the following publications U.S. Pat. Nos. 2,483,082, 2,572,555 and 3,559,423DE-OS No. 16 00 607, DE-OS No. 23 30 807, German utility model 81 06 063 and British Patent No. 1 209 144.

All these apparatuses operate with a liquid refrigerant, which optionally evaporates and in part, particularly in the case of circulation, remains in the liquid phase, but in no case solidifies.

The need to recirculate the refrigerant is disadvantages due to the costs involved, whereas, if the refrigerant, namely the chlorinated hydrocarbons have to be discharged into the environment, it is prejudicial to the latter, so that the use of chlorinated hydrocarbons is no longer desired and is in part forbidden. If the casing of the sleeve surrounding the pipes as such, without the pipe, is completely closed and, consequently, has an inner wall, the action is made worse, because the heat transfer must take place via the inner wall.

The latter disadvantage also remains in the apparatus according to German Patent No. 601 278, which operates with solid carbon dioxide. The latter is introduced in this form through the relatively large openings provided on the end walls of the casing and which are subsequently closed. The casing has vents in the form of vent valves.

The use of liquid carbon dioxide, which only ices in the vicinity of the pipe line to be frozen and forms carbon dioxide snow is possible as a result of a stable sleeve placed around the pipe and with a flexibile pipe seal formed as a function of the pipe diameter. It has proved that such a sleeve is not practical and is disadvantageous, which is partly due to the aforementioned construction. As the carbon dioxide in the vicinity of the outer jacket of the sleeve enters the cavity formed between the sleeve and the pipe and therefore remote from the actual pipe, the dry ice initially preferably forms directly around the pipe and between the latter and the supply opening, so that an insulating layer is formed round the pipe. The dry ice layer on the pipe surface initially evaporates, but is still enveloped by the dry ice and can consequently not escape. Thus, it forms a gas gap insulating layer between the dry ice and the pipe, which further reduces the effectiveness of icing. The refrigerant supply opening is located in the outer jacket of the sleeve and is blocked by the formation of the dry ice layer. In order that the ice plug formed can be forced out, the carbon dioxide must be supplied under high pressure. This cannot take place continuously for technical and economic reasons, so that carbon dioxide is only supplied at certain intervals, which also impairs efficiency.

In order to bring about an improvement a flexible, non-self-supporting sleeve in the form of a jacket has been chosen, which is placed around the pipe and fixed round the pipe wall by strings or cords. This leads to a flexible bag sleeve, which only partly removes the disadvantages of the aforementioned sleeve. The gas gap insulating layer between the dry ice and the pipe wall which also forms in the case of the bag sleeve can partly be eliminated in that every so often the outer wall of the bag sleeve is intensely manually kneaded. However, this is very disadvantageous due to the pronounced cooling action of dry ice. The constant kneading also very disadvantageously influences the quality of the bag sleeve. The use of this bag sleeve is very complicated and does not alter anything as regards the long freezing times and the high carbon dioxide requirement of such sleeves. As a result of the clogging and freezing up of the inlet port, it is not possible to supply the carbon dioxide in a regulated, reduced quantity and must instead be supplied at a considerable pressure with a wide open feed valve, with a carbon dioxide quantity which is excessive by the plug icing up the opening, so that here again the supply must take place at intervals.

The aim underlying the invention essentially resides in avoiding the aforementioned disadvantages by an apparatus having a self-supporting casing sleeve, which permits an effective icing of a pipe by liquid carbon dioxide.

According to the invention, an apparatus of the aforementioned type is provided wherein the casing has two parts which can be directly fixed or braced together substantially at right angles to the casing axis with, in each case, end walls kept spaced by a jacket wall and a carbon dioxide supply lance can be engaged with its end face having a nozzle opening with the connecting face of the inside edges of the end walls.

Unlike in the case of one-part casings, the two-part construction leads to a symmetrical bracing in two diametrically facing areas, corresponding sleeve sizes being obtained for corresponding pipe masses, so that a better fixing and sealing can be achieved of the type necessary when using liquid carbon dioxide. Due to the fact that the frontal opening of the lance can be brought up to the circumferential area of the edges of the casing end walls, it is ensured that the opening of the lance issues directly over the wall of the icing pipe. Thus, carbon dioxide constantly flows along the pipe in the form of a film, partly in liquid and partly in gaseous form, whereas solid carbon dioxide only forms as an insulating layer between said film and the outer jacket wall of the casing, but is not deposited directly on the wall of the icing pipe. This leads to higher effectiveness of the icing, in that the heat absorption of the environment is reduced, whereas that of the pipe is increased, the absorbed heat evaporating the liquid supplied carbon dioxide and which, despite a fixing of the casing parts to the pipe, flows out particularly in the resulting connecting area. Additionally it would be possible to provide an outlet port having a regulating valve, which would preferably diametrically face the inlet port for the carbon dioxide. The lance can be fixed in the jacket wall of the casing along its axis and project into the aforementioned area. However, according to a preferred embodiment, the lance is fixed by frictional resistance in an opening of the jacket wall of a casing part, so that it is possible to ensure even under different bracing conditions and different pipe thicknesses for which a casing can be used to a restricted extent, a mounting of the end face of the lance on the wall of the pipe to be iced.

According to another preferred embodiment the valve in the supply line is a ball valve, which has a small passage opening in the ball corresponding to an economic carbon dioxide passage quantity for all pipes to be frozen. Icing makes a conventional poppet valve very difficult and possibly even impossible to operate.

The inlet port in the end face of the carbon dioxide supply lance is preferably a fine nozzle with a diameter between 0.5 and 1.0 mm, because with a given refrigerant supply quantity the latter flows in with an adequate and in particular higher speed than with an earlier opening and therefore improves the flow round the pipe wall.

Although the two casing parts can engage over or in one another in different ways, in that they are e.g. identically constructed and one casing part overlaps on one side and the other on the other side, according to a preferred embodiment the external diameter of the jacket wall of one of the casing parts corresponds to the internal diameter of the jacket wall of the other casing part and the spacing of the outsides of the end walls of one casing part corresponds to the spacing of the insides of the end walls of the other casing part. This leads to a reliable, tight connection of the two casing parts during and after fixing round a pipe. The fixing of the casing parts to a pipe preferably takes place by screws provided with nuts or screw-nut connections. In preferred manner, the casing parts have substantially radially and longitudinally extending tongues, which are provided with openings, through which can be passed screws and onto which can be screwed nuts. The holes in the tongues of one of the casing parts are in particular elongated slots or holes. So that the heads of the screw and nut are located in a flat and planar manner on the tongues, according to a further development the lateral faces of the tongues remote from the adjacent flange of the in each case other casing part are parallel to one another. The tongues taper from their connection side with the actual casing to the free side thereof in a trapezoidal manner, the facing lateral faces being directed substantially radially by tongues interconnected by a screw. While the circumferential extension of the two casing parts can fundamentally differ and e.g. the circumferential extension of the casing part engaging in the other part is greater than the part overlapping it, so that the tongues can be substantially aligned on in each case one casing part, according to a preferred development the casing parts extend substantially over the same circumferential angle range. To ensure an adequate fixing area, the tongues are arranged in angularly displaced manner on the casing parts, so that the circumferential spacing of the tongues of the inner casing part is smaller than that of the overlapping casing part. An optimum angular range for the circumferential extension of the casing parts is 210°.

The inventive apparatus provides the possibility of an all-around icing of pipes by carbon dioxide, which obviates the disadvantages of the prior art and, in particular, permits an effective icing also with respect to the aforementioned crimped sleeve. For the same test conditions, shorter icing times and carbon dioxide consumption quantities have been noted. Compared with the known self-supporting sleeves only usable with other liquid refrigerants, the inventive construction of the icing casing significantly reduces the icing time and offers considerable economy with the refrigerant costs involved. As a result of the ball valve provided it is possible to have a continuous regulated supply also of carbon dioxide with a constant supply rate. This ensures that the frozen ice plug will remain in the pipe throughout the working period.

Further advantages and features of the invention can be gathered from the claims and description relative to a non-limitative embodiment and the attached drawings.

DETAILED DESCRIPTION

Figure 1:
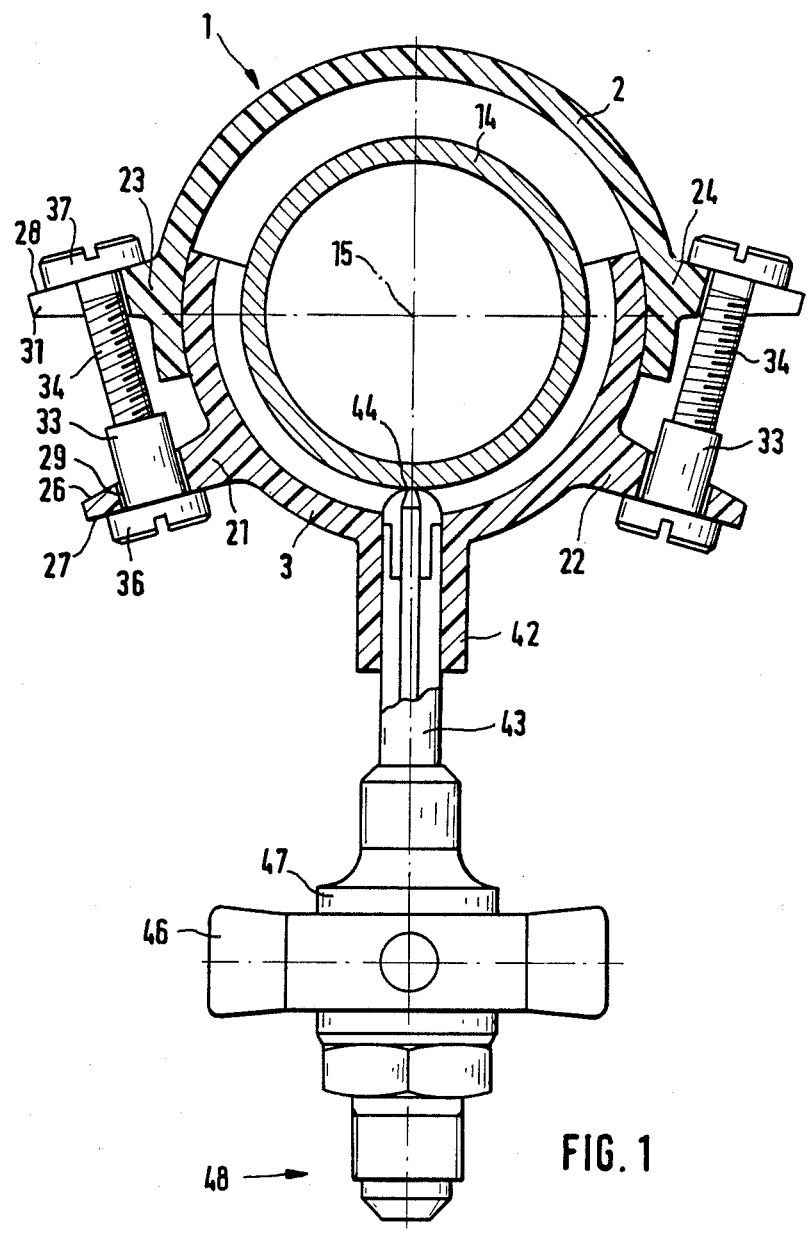
FIG. 1 is a cross sectional view of an apparatus for freezing liquid pipes constructed in accordance with the present invention taken at right angles to an axis of symmetry of the apparatus.
Figure 2:
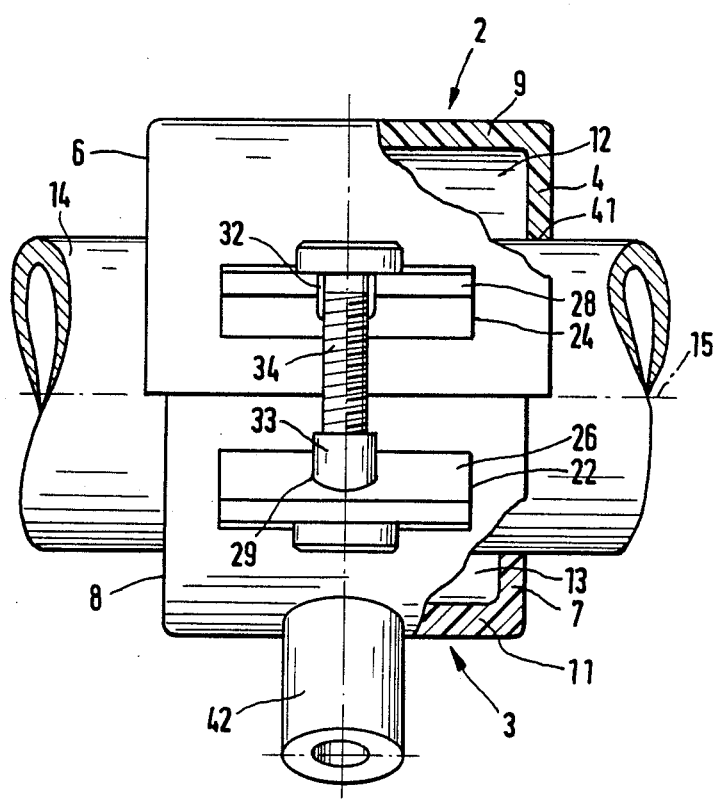
FIG. 2 is a partial cross-sectional plan view of the apparatus of FIG. 1.

Referring now to the drawings wherein like reference numerals are used in both views to designate like parts and, more particularly, to FIG. 1, according to this figure, an apparatus generally designated by the reference numeral 1, constructed in accordance with the present invention, includes two casing parts 2, 3, which are, in each.

The inventive apparatus 1 has two casing parts 2,3, which are in each case, part ring-shaped and have two end walls 4,6 or 7,8, which are axially spaced and between which is located a jacket wall 9 or 11, so that in radial section the casing 2,3 has a U-profile opening towards its inside or concave side and surrounds an inner area 12 or 13, which is bounded by a liquid-carrying pipe 14, on which the apparatus 1 is mounted.

In the represented embodiment both casing parts 2,3 extend to the same extent over a pipe 14 by an angular range of more than 180°, here to 210°. Casing part 2 overlaps casing part 3 in the manner shown in FIG. 1. The external radius of part 3 corresponds to the radius of the inside of jacket wall 9 of part 2. The spacing of the outsides of end walls 7,8 of part 3 corresponds to the axial spacing of the insides of end walls 4,6 of part 2.

Both casing parts 2,3 are symmetrically provided with in each case approximately radially outwardly extending tongues 21,22 or 23,24, which extend substantially over the width of the apparatus 1 in the direction of the axis of symmetry. In section at right angles to axis of symmetry 15, the tongues are trapezoidal and taper outwards. The side 26 of the tongue of one part facing the tongue of another part extends substantially radially, while the wall face 27 of the tongue of one part, remote from the tongue of the other part is substantially parallel to the remote wall 28 of the other part. The tongues have openings 29, which can optionally be constructed as elongated holes 32 open towards the free end side 31 of the corresponding tongue (here 23,24). Screws 34 provided with nuts 33 are passed through the holes 28 and into the elongated holes 32, in such a way that the heads 36,37 of nut 33 or screw 34 engage on the larger lateral faces 27,28 of tongues 21, 23. By fastening them screw 34 and the nut 33 against one another, the two casing parts 2,3 can be braced together, the abutment being constituted by the pipe 14 embraced by them.

Only the left-handside of FIG. 1 was described hereinbefore in connection with the fixing and bracing means. As shown, on the right-handside there are also tongues 22,24, which are constructed in the same way as on the other side and to which in the same way can be fitted a not shown screw-nut connection 33,34 for bracing the two parts 2,3. This leads to a symmetrical bracing, which is important for the intended use. After fixing the apparatus 1 on a pipe 14, the inner terminal edges of end walls 7,8 or 4,6 are fixed in the outer circumference of pipe 14, so that the internal radius R of the terminal edges 41 of the end walls coincides with the external radius of pipe 14.

At least the jacket wall 11 of one of the casing parts (here 3) has a radially directed connecting opening 42, in which is located by frictional resistance in the represented embodiment a carbon dioxide-supplying lance 43, so that the latter is longitudinally displaceable in the connection opening at right angles to axis 15 and particularly after mounting the apparatus 1 on a pipe 14 and fixing to the pipe can be inserted until it abuts with the surface of pipe 14. Thus, the end face 44 of lance 43 projects up to the inner circumference of end walls of parts 2,3 or their surface connecting their ends 41. Lance 43 has a ball valve 47 operable by a level 46, because in the case of the refrigerant used, namely liquid carbon dioxide, the dry ice (carbon dioxide snow) formed through expansion by rapid pressure reduction, ices up conventional poppet valves, so that the latter are difficult or impossible to operate.

Lance 43 is connected by a preferably flexible hose 48, which is optionally a spiral hose, to the refrigerant means, in this case a bottle containing liquid carbon dioxide under high pressure (carbon dioxide bottle or cylinder). The frontal opening lance 43 has a very fine nozzle with a diameter of less than 1 mm and, preferably, approximately 0.5 mm.

After mounting and fixing the apparatus 1 to a pipe 14, placing lance 43 with its end 44 on pipe 14 and therefore moving it up to the inner radius of the end walls of the casing part, initially the stop valve of the liquid gas cylinder is opened and then ball valve 47 is completely opened by the lever 46. Thus, liquid carbon dioxide passes from the carbon dioxide bottle via hose 48 and lance 43 directly onto the surface of pipe 14 and along and over the circumference thereof, so that in the cavity 12 between the apparatus 1 and pipe 14 carbon dioxide dry ice forms in known manner as a result of the rapid pressure reduction, while as a result of the continuous flow under high pressure and the provision of lance 43 and particularly its end face provided with the nozzle, carbon dioxide flows directly onto the surface of pipe 14 and is therefore in contact with the latter, absorbed by it and can evaporate. A thermally insulating dry ice layer is formed on the radial outside, so that the heat losses due to the heat absorption of the carbon dioxide from the environment are kept low and can preferably and directly take up heat from pipe 14. Evaporated carbon dioxide passes out, even in the case of high bracing of the apparatus 1, fashioned of a plastic material particularly at the contact line between casing part 2,3 and wall of the pipe 14.

I claim:

1. Apparatus for freezing liquid-carrying pipes, the apparatus comprising an annular casing having an inwardly open cross section, supply line means for supplying a refrigerant to an interior of the casing, valve means provided in said supply line means, said casing including a first casing part and a second casing part directly fixed together at right angles to a longitudinal center axis of the casing, each of said first and second casing parts including end walls spaced by jacket wall means, and wherein a carbon dioxide supply lance means is inserted in one of the first and second casing parts, the carbon dioxide supply lance means includes an end face having an opening adapted to be brought into contact with an exterior surface of the liquid carrying pipe so as to enable carbon dioxide to pass directly onto the liquid carrying pipe and over a circumference thereof.

2. Apparatus according to claim 1, wherein the carbon dioxide supply lance means is inserted under a frictional resistance in an opening of the jacket wall means of one of the first and second casing parts.

3. Apparatus according to one of claims 1 or 2, wherein the valve means includes a ball valve disposed at an inlet of the carbon dioxide supply lance means.

4. Apparatus according to one of claims 1 or 2, wherein said jacket wall means of one of the casing parts has an external diameter corresponding to an internal diameter of the jacket wall means of the other casing part, and wherein a spacing between outside portions of end walls of one casing part corresponds to a spacing of inside portions of the end walls of the other casing part.

5. Apparatus according to one of claims 1 or 2, wherein the casing parts have substantially radially and longitudinally extending tongues provided with openings through which extend fastener means.

6. Apparatus according to claim 5, wherein at least the holes in the tongues of one of the casing parts are elongated holes.

7. Apparatus according to claim 5, wherein lateral faces of the tongues remote from an adjacent flange of the other casing part, are parallel to one another.

8. Apparatus according to one of claims 1 or 2, wherein the first and second casing parts extend substantially over the same circumferential angular range.

9. Apparatus according to claim 8, wherein the first and second casing parts extend over an angle of approximately 210°.

* * * * *